(12) United States Patent
Gassner et al.

(10) Patent No.: US 7,264,194 B2
(45) Date of Patent: *Sep. 4, 2007

(54) MACHINE-DETECTABLE ADHESIVE TAPE (75) Inventors: Thomas Gassner, Heidgraben (DE);
Markus Eikmeier, Lensahn (DE);
Bernhard Gebbeken, Hamburg (DE);
Christoph Nagel, Hamburg (DE)

(73) Assignee: Tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/488,151

(22) PCT Filed: Aug. 29, 2001

(86) PCT No.: PCT/EP01/09964

§ 371 (c)(1),
(2), (4) Date: Jul. 20, 2004

(87) PCT Pub. No.: WO03/018454

PCT Pub. Date: Mar. 6, 2003

(65) Prior Publication Data

US 2004/0256517 A1    Dec. 23, 2004

(51) Int. Cl.
*B65H 19/18* (2006.01)
(52) U.S. Cl. .............................. 242/555.3; 242/556.1; 242/563
(58) Field of Classification Search ................ 242/556, 242/556.1, 551, 555, 555.4, 563, 555.3; 156/505, 506, 304.3; 428/328, 344, 40.2
See application file for complete search history.

(56) References Cited

U.S. PATENT DOCUMENTS

| | | | | |
|---|---|---|---|---|
| 3,967,994 A | * | 7/1976 | Langberg | ...................... 156/64 |
| 4,588,344 A | * | 5/1986 | Burke et al. | ............. 242/559.3 |
| 5,646,794 A | * | 7/1997 | Lindsay et al. | ................. 360/3 |
| 5,901,919 A | * | 5/1999 | Wienberg | ................. 242/556.1 |

FOREIGN PATENT DOCUMENTS

| | | |
|---|---|---|
| DE | 196 28 317 A1 | 1/1998 |
| DE | 196 32 689 A1 | 2/1998 |
| DE | 198 30 673 A1 | 1/2000 |
| DE | 198 30 674 A1 | 1/2000 |
| DE | 199 02 179 A1 | 8/2000 |
| EP | 0 418 527 A2 | 3/1991 |

(Continued)

OTHER PUBLICATIONS

International Search Report, Mar. 13, 2002.

(Continued)

*Primary Examiner*—David H Bollinger
*Assistant Examiner*—William E Dondero
(74) *Attorney, Agent, or Firm*—Christa Hildebrand; Norris McLaughlin & Marcus, PA (57) ABSTRACT

The invention relates to an adhesive tape for a flying reel change of a flat material wound up over a reel, provided with a main support, a self-adhesive composition on the face side and at least, on the back side, one strip of a double-sided adhesive tape which has a detachable support provided on its two sides with a self-adhesive composition. The invention is characterized in that the adhesive tape is provided with at least one device which can be detected by an optical detector.

4 Claims, 4 Drawing Sheets

FOREIGN PATENT DOCUMENTS

| | | |
|---|---|---|
| EP | 0 683 122 A1 | 11/1995 |
| EP | 0 757 657 B1 | 2/1997 |
| JP | 01252444 A * | 10/1989 |
| JP | 04012953 A * | 1/1992 |
| WO | WO95/299115 | 11/1995 |

OTHER PUBLICATIONS

WO 03/018452, Mar. 6, 2003.
WO 03/018453, Mar. 6, 2003.
WO 03/018451, Mar. 6, 2003.

* cited by examiner

MACHINE-DETECTABLE ADHESIVE TAPE

BACKGROUND OF THE INVENTION

This application is a 371 of PCT/EP01/09964, filed Aug. 29, 2001.

The invention relates to an adhesive tape for a flying reel change of flat web material wound up on reels, equipped with at least one cleavable adhesive system, and to a splicing method for the flying reel change of flat web material wound up on reels.

The flying reel change is a familiar method in paper mills or the like of replacing an old paper reel which has virtually been unwound by a new one without having to stop the high-speed machines. The end of the old paper web is in this case adhesively bonded to the start of the new paper web, in order to ensure operation which is as continuous as possible. For this purpose, use is made of double-sided self-adhesive tapes, that are known as tabs, which are firstly highly adhesive and tacky but secondly, on account of their water-soluble self-adhesive compounds and paper carriers are not disruptive when the paper waste is reused in the papermaking machine. Classically, the tabs are stuck to the web start manually; this process requires the use of specialist personnel and for to results which are technically not advantageous, since the adhesions are relatively thick as a result of the sequence of paper webs and adhesive strips. Diverse products can be obtained for the adhesion during a flying reel change, in particular those which, in addition to a paper carrier, have a water-soluble self-adhesive compound coated on both sides.

EP 418 527 A2 discloses a method of preparing a printing material web reel in a reel changer of a rotary press, in which adhesive strips are used which are subdivided into three zones (column 3, line 12 ff. and FIGS. 1 and 2), the central zone 6 being perforated. Tearing then takes place at this perforation.

However, in practice adhesive tapes of this type have serious disadvantages, in particular as a result of the adhesive areas which are present after the splice.

However, DE 196 28 317 A1 has also already disclosed adhesive tape for such applications in which, after the splice has been carried out, adhesive areas no longer occur, use being made there of a cleavable paper carrier, which cleaves during the splice and, after the splice has been carried out, covers the adhesive compounds. DE 196 32 689 A1 also discloses a similar adhesive tape for this application, but here a cleavable paper carrier is used, which cleaves over the entire width of the adhesive tape.

The non-adhesive covering of adhesive regions which are otherwise open is disclosed by DE 196 32 689 A2. Here, an adhesive tape for dynamic loadings during the splicing process is described, whose paper carrier cleaves and covers the adhesive compounds with its residues.

DE 198 30 673 shows an adhesive tape for the flying reel change in paper conversion machines or the like, which has a paper carrier coated on both sides with a water-soluble self-adhesive compound. An edge region of the rear of the adhesive tape is equipped with a single-sided adhesive tape which, for its part, has a cleavable paper carrier.

A further variant is described in DE 198 30 679. Here, an adhesive tape with two cleaving strips is illustrated.

DE 199 02 179 A2 also shows an adhesive tape for a splicing method. On its non-adhesive rear, this adhesive tape bears a double-sided adhesive tape which has a cleavable paper carrier, cleaves during the splicing method and covers the respective adhesives. In order to avoid tears during the flying reel change, the laminated adhesive tape with a paper carrier of cleavable paper is arranged to be moved in, specifically at a certain distance from the longitudinal edge of the adhesive tape.

It is an object of the invention to provide an adhesive tape and a splicing method which does not exhibit the disadvantages of the prior art, or only to a reduced extent, and which permits automated control of the splicing method.

BRIEF SUMMARY OR THE INVENTION

This object is achieved in a manner that is surprising and cannot be foreseen by those skilled in the art by an adhesive tape as represented in the main claim, and by a method as explained in claim 3. The subclaims relate to advantageous embodiments of the inventive adhesive tape and further developments of the inventive method.

In accordance with that stated above, claim 1 relates to an adhesive tape for the flying reel change of flat web material wound up on reels, equipped with a main carrier, a self-adhesive compound on the front side and at least one strip of a double-sided adhesive tape on the rear side which, in turn, has a cleavable carrier which is equipped on both sides with self-adhesive compound. According to the invention, this adhesive tape is equipped with at least one device that can be detected mechanically by means of a detector.

The invention therefore provides an adhesive tape which has integrated in it the function of the signal label otherwise stuck on later.

Use is made of an adhesive tape which has at least one main carrier with at least one layer of a self-adhesive compound on the front side. On the underside of the adhesive tape there is a cleavable system in the form of a strip. During the splice, this cleavable system cleaves in such a way that no adhesive residues remain and hamper the passage of the splice through the machine.

For the structure of the label according to the invention, in principle use can be made of all correspondingly constructed adhesive tapes which can be used for the flying reel change ("Easy Splice"). For example, reference should be made here to DE 196 28 317 A1, DE 198 30 673 A1, DE 198 30 674 A1, DE 199 02 179 A1.

In a preferred expansion of the invention, the main carrier of the adhesive tape is equipped in such a way that it is used for the machine detection. In a particularly advantageous embodiment of the invention, the main carrier consists of a material to which at least one detectable additive is added, and/or the main carrier has at least one layer of a detectable material.

The detectors which can be used are, for example, metal detectors. For this purpose, metal powder or granules, for example, are mixed with the actual carrier material, or the basic carrier framework is provided with one or more metal layers. In a variant of the adhesive tape according to the invention, the integrated signal function is implemented by the main carrier being provided on the upper side and/or on the underside with an aluminum layer, specifically advantageously over the entire area.

In order to produce an embodiment of the main carrier used according to the invention, it is possible to use all methods which permit carrier materials to be provided with one or more metal layers. These include, for example:

composites of one or more aluminum foils and one or more layers of a carrier material or different carrier materials. The individual layers can be laminated, adhesively bonded, welded, pressed together, embossed together, sintered or otherwise connected to one another, preferably permanently but also reversibly, and a combination of these methods is also possible, coatings of the carrier material with thin aluminum layers by means of vapor deposition, painting, spraying, sputtering and the like, it being possible for the coatings to be applied chemically and/or physically, all further coating processes suitable for this purpose, and multiple coatings in accordance with one or more of the methods listed above.

Instead of aluminum, the layer used can also be all further materials that can be detected in accordance with the requirements, in particular metals, for example copper, silver, gold.

In a next embodiment of the invention, the detection is brought about by transponder systems, in particular by thin layer transponders, which are integrated into the adhesive tape. Here, embodiments with active and passive transponders can be implemented.

A further embodiment of the inventive adhesive tape is distinguished by the fact that the adhesive tape is provided with devices that can be registered optically. These can be bar codes, for example, which can be read with a laser. When bar codes are used, in addition to the actual detection action, additional information can be transmitted, for example information about the type or web thickness of the new reel. Thus, if reels of different type or composition are used, the processing system can automatically be adjusted to the new processing conditions without further external control being required.

Optical reflectors or diffraction gratings which are fitted in or on the main carrier of the adhesive tape function in a similar way. These can likewise be detected optically and initiate the splicing operation.

A further example of optically detectable devices is specific coloration is of the main carrier, which can likewise be registered by suitable detection systems.

The inventive adhesive tape is detected during the acceleration of the paper reel and thus triggers the splicing operation at the correct time, furthermore the aluminum layer is detected in what is known as the reject diverter, in which that quantity of paper which contains the splice is sorted out. The inventive adhesive tape thus performs functions which have previously been provided by additional labels or markings. The labels previously used cause sources of error, since the signal generator and the adhesive splice tape have to be adjusted accurately to each other.

In previous methods, the detection is ensured as standard by an aluminized label. In this case, there is the danger that the label will be wrongly positioned, as a result of which several problems can occur.

Firstly, the label can be stuck outside the detection field of the detector. In this case, the reel changer does not detect the splice and the reel change does not take place, that is to say the machine has to be stopped, the paper has to be threaded manually into the press.

Secondly, the distance between splice and aluminized label must be defined accurately and also maintained accurately. If these distances do not agree, the old paper web will be cut off either too early or too late. In the event that it is cut off too early, it can occur that the adhesion between the new reel and the web running out has not yet taken place adequately, and a break then occurs, which also results in machine stoppages again. If the old web is cut off too late, the projecting paper residue, what is known as the flag, is lengthened. Too long a flag can project out of the paper web in the further processing process, such as the printing, and can become caught on deflection rollers or in the printing unit and thus lead to disruption or breaks.

Thus, firstly inaccuracies in the sticking lead to a disrupted function, secondly malfunctions are based on the fact that the signal label falls off or "slips" on the reel. Furthermore, the signal label provides an additional adhesive bond at which, in the event of partial separation of the label, adhesive areas can be exposed in an uncontrolled manner and disrupt the paper processing process, for example stick the paper together in an uncontrolled manner.

As a result of the integration of the switching function directly into the adhesive splicing tape, the splicing reliability could be increased considerably as compared with the previous procedure, substantially fewer malfunctions were established.

An additional advantage of the invention is that information can be passed on to the process control via the adhesive splicing tape without contact, for example information about the current rotational speed of the new reel. The invention therefore also permits, in the event of malfunctions of the apparatus, for example a new reel that is not running correctly (wrong speed, imbalance or the like), the initiation of an emergency stop or introduction of other measures to correct the error.

The main carrier used is preferably a tear-resistant paper or film carrier. The following carrier materials may be listed here by way of example: slightly creped papers, machine-glazed body papers, one-sided coated smooth body papers, two-sided coated, compacted, printable decorative papers, single-sided double-coated, woodfree, highly glossy kraft papers, without wishing to restrict the selection of the carrier materials unnecessarily by these examples.

Use is advantageously made of a cleavable system which has a considerably lower cleavage strength than a paper carrier which has to absorb tensile forces. The cleavable system or systems are preferably based on sized highly consolidated paper, on a composite of paper and film or on a composite of two films, it being possible for the composite to consist of papers and/or films connected in a defined point-like and/or linear manner. For this purpose, for example, the following papers, paper composite systems or films are particularly suitable:

easily cleavable paper systems, for example non wet-strength papers duplex papers (papers laminated together in a defined manner, the cleaving operation proceeds extremely homogeneously; no stress peaks arise, for example as a result of inhomogeneous compaction. These papers are used for the production of wallpapers and filters.)

highly consolidated papers glued together in a defined manner (papers with a high cleavage strength).

The glueing can be carried out, for example, with starch, starch-containing derivatives, wallpaper pastes based on methyl cellulose (tesa® paste, tesa AG, Hamburg; Methylan®, Henkel KgaA, Düsseldorf) or polyvinyl alcohol derivatives. Such systems are described, for example, in EP 0 757 657 A1.

coextruded films.

It is particularly advantageous if the cleavage strength of the cleavable system is 5 to 70 cN/cm, in particular 12 to 60 cN/cm. In relation to cleavage strength and its measurement, reference is made to DE 199 02 179 A1.

In a very advantageous embodiment, the distance (V) of the double-sided adhesive tape (6) from the front edge (longitudinal edge 14) of the main carrier is up to 15 mm, in particular 0.5 to 15 mm, preferably 1 to 7 mm, very preferably 1.5 to 3.5 mm.

If a plurality of cleavable systems is applied to the adhesive tape, then the distance of the cleavable systems from one another is advantageously 3 to 50 mm. Distances of 25 to 45 mm, quite particularly distances of 30 to 40 mm, are selected.

The cleavable system or systems advantageously have the same width as the main carrier. In a further beneficial embodiment, on the other hand, it is advantageous if the main carrier is wider than the cleavable system.

The width of the cleavable system is preferably 3 to 40 mm, in particular 6 to 12 mm.

In the case of a plurality of cleavable systems on the adhesive tape, these can consist of the same material and thus exhibit the same cleavage forces, but it can also be advantageous to provide the cleavable systems from different material, so that these possess different cleavage forces.

In a very preferred embodiment of the invention, the self-adhesive compound used (in the sense of the self-adhesive compound corresponding to item numbers 3, 8 and/or 9 of the figures) is an acrylic contact adhesive compound. Both water-soluble and water-insoluble acrylics can advantageously be used.

Furthermore, natural and synthetic rubber compounds and also dispersions of the abovedescribed compounds can also be used. It should be pointed out that, in principle, all basic types of contact adhesive compounds which meet the criteria according to the invention can be used.

In a further preferred embodiment, the self-adhesive compound is provided with a covering which, if appropriate, is provided with a perforation or a slit in the longitudinal direction. The slit can preferably be provided at a distance A of 20 to 40 mm from the longitudinal edge 15 of the adhesive tape which is opposite the front longitudinal edge 14, in the vicinity of which the cleavable system 6 is arranged.

The adhesive tape is employed in reel changers and reject diverters in which the splice detection is carried out inductively or without contact. The adhesive tape is preferably employed in methods as described in more detail in the following text.

The invention relates further to a splicing method for the flying reel change of flat web material wound up on reels, in which the uppermost paper web of a new reel is fixed to the web lying underneath with an adhesive tape, which is equipped with at least one main carrier, at least one layer of a self-adhesive compound on the front side and at least one cleavable system on the underside, and part of the self-adhesive compound which is needed for the splicing process is exposed, whereupon the new reel equipped in this way is placed beside an old reel which has been unwound virtually completely and is to be replaced, and is accelerated to substantially the same rotational speed as the latter, is then pressed against the old web, the exposed self-adhesive compound of the adhesive tape bonding adhesively to the old web at substantially the same speeds of the webs, while at the same time the cleavable system cleaves in such a way that, following the cleaving operation, no adhesive regions are exposed, and the time of the splicing operation being determined by a detector and, in particular, the adhesive tape or at least a part thereof being detected mechanically by the detector.

In a further development of the inventive method, the adhesive tape is stuck at right angles to the moving paper web. In advantageous variants of the inventive method, adhesive bonding of the adhesive tape can also be carried out at an acute angle of up to 30° with respect to the moving paper web, in particular of up to 10°.

In the splicing method, an adhesive tape is stuck to a new paper reel in a straight line under the uppermost web, so that part of the adhesive tape remains free, while the underside of the adhesive tape sticks to the web lying underneath and therefore secures the uppermost web, if appropriate, initially only part of the covering possibly located on the self-adhesive compound having been pulled off, so that the part of the self-adhesive compound which is needed for the splicing method is still covered by the covering and, in this state, the reel has no free adhesive surface, following which, for the final preparation for the splicing method, the remaining covering which may possibly still be present is removed, whereupon the new reel equipped in this way is placed beside an old reel which has been unwound virtually completely and is to be replaced, and is accelerated to the same rotational speed as the latter, is then pressed against the old web, the exposed self-adhesive compound of the adhesive tape bonding to the old web at substantially the same speeds of the webs, while at the same time the cleavable carrier of cleavable material cleaves and, with its residues, covers both self-adhesive compounds which had been coated onto it, in a non-adhesive manner.

Following the contact between the adhesive tape and the web running out, cleavage of the cleavable system on the adhesive tape therefore occurs, so that the uppermost paper layer of the new bale is released and no more adhesive residues are present in exposed form. In order to withstand the high temperatures and/or pressures, use is preferably made of an inventive adhesive tape, that is to say one such which has a particularly shear-resistant adhesive compound for joining the paper webs.

BRIEF DESCRIPTION OF THE DRAWINGS

In the following text, the invention is to be described in more detail using an exemplary embodiment, but without wishing to restrict it unnecessarily thereby. In the drawing.

DETAILED DESCRIPTION OF THE INVENTION

Figure 1:
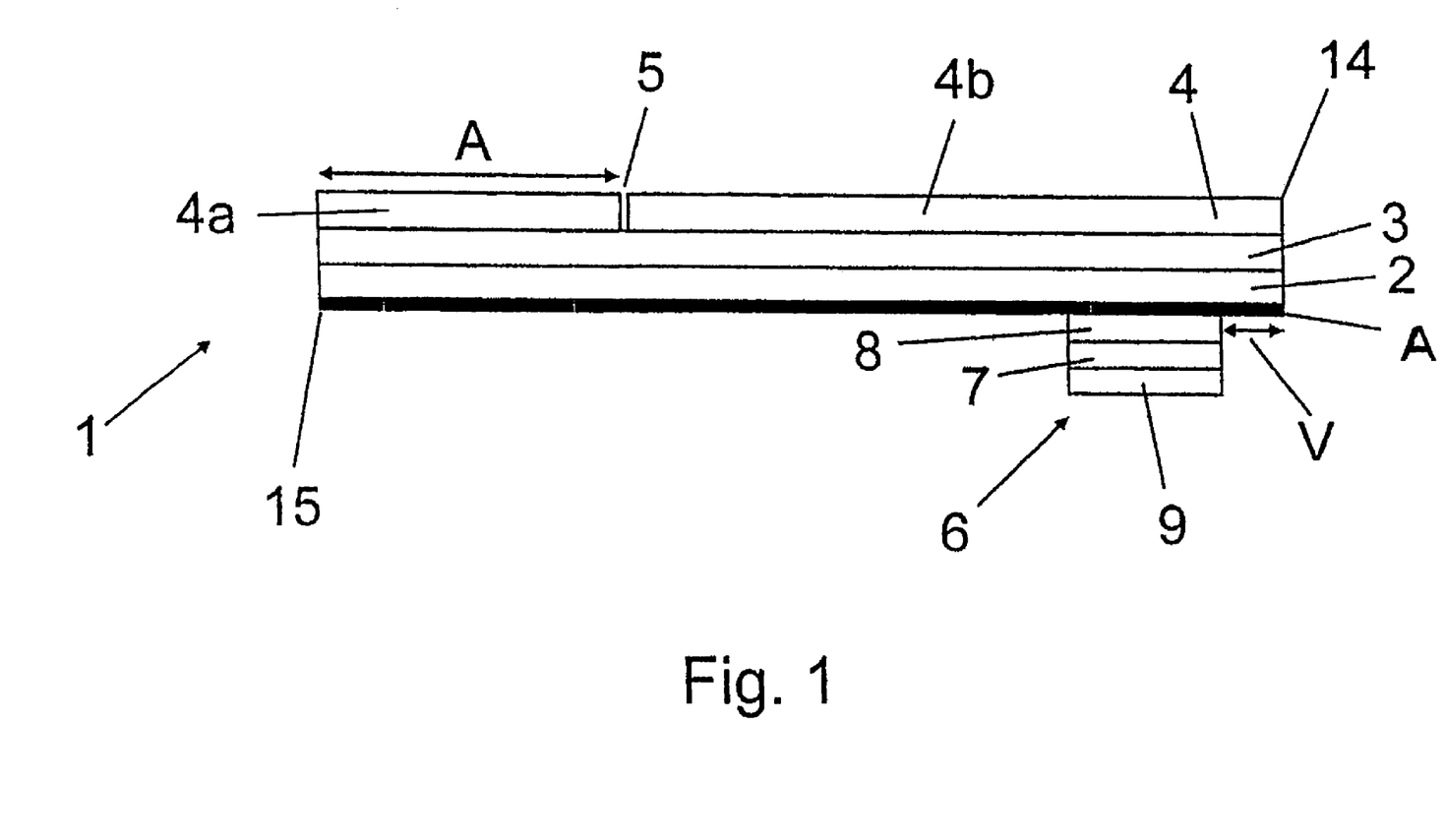
FIG. 1 shows a lateral schematic view of an inventive adhesive tape with an aluminum layer

In detail, FIG. 1 shows an adhesive tape 1 with a main carrier 2, coated on one side with a water-soluble self-adhesive compound 3. The main carrier 2 consists of a composite of lightly creped paper and aluminum. In the exemplary embodiment, there is an aluminum layer A on the underside of the main carrier 2. The total thickness of the main carrier 2 with self-adhesive compound 3 is 0.088 mm, the width 150 mm.

The self-adhesive compound 3 is covered with a siliconized release paper 4 which, at a distance of 30 mm from the left-hand edge, is provided with a slit 5, so that the left-hand part 4a of the release paper 4 can be removed first of all, and then the right-hand part 4b.

In the region of the right-hand end of the adhesive tape 1, a strip of a double-sided adhesive tape 6 is stuck underneath, consisting of a paper carrier 7 of cleavable paper coated on both sides with water-soluble self-adhesive compound 8 and 9. The adhesive tape has a width of 9 mm.

Figure 2:
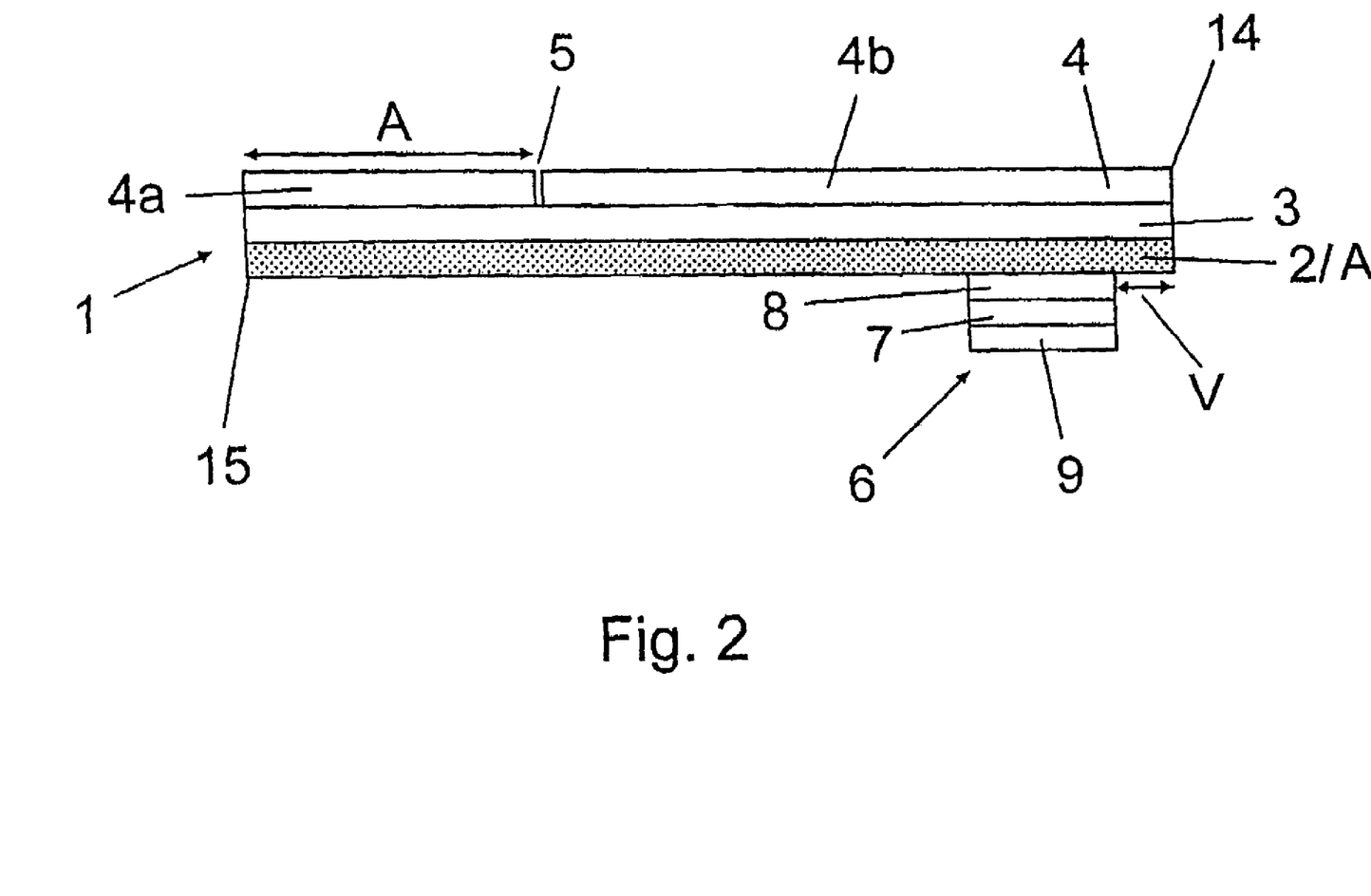
FIG. 2 shows a lateral schematic view of an inventive adhesive tape with a detectable additive in the carrier layer

FIG. 2 shows a corresponding inventive adhesive tape, in which a detectable additive is added to the main carrier layer 2; in the figure, this layer is designated 2/A. The additive can be, for example, a metal dust or granulate, in particular an aluminum granulate.

Figure 3:
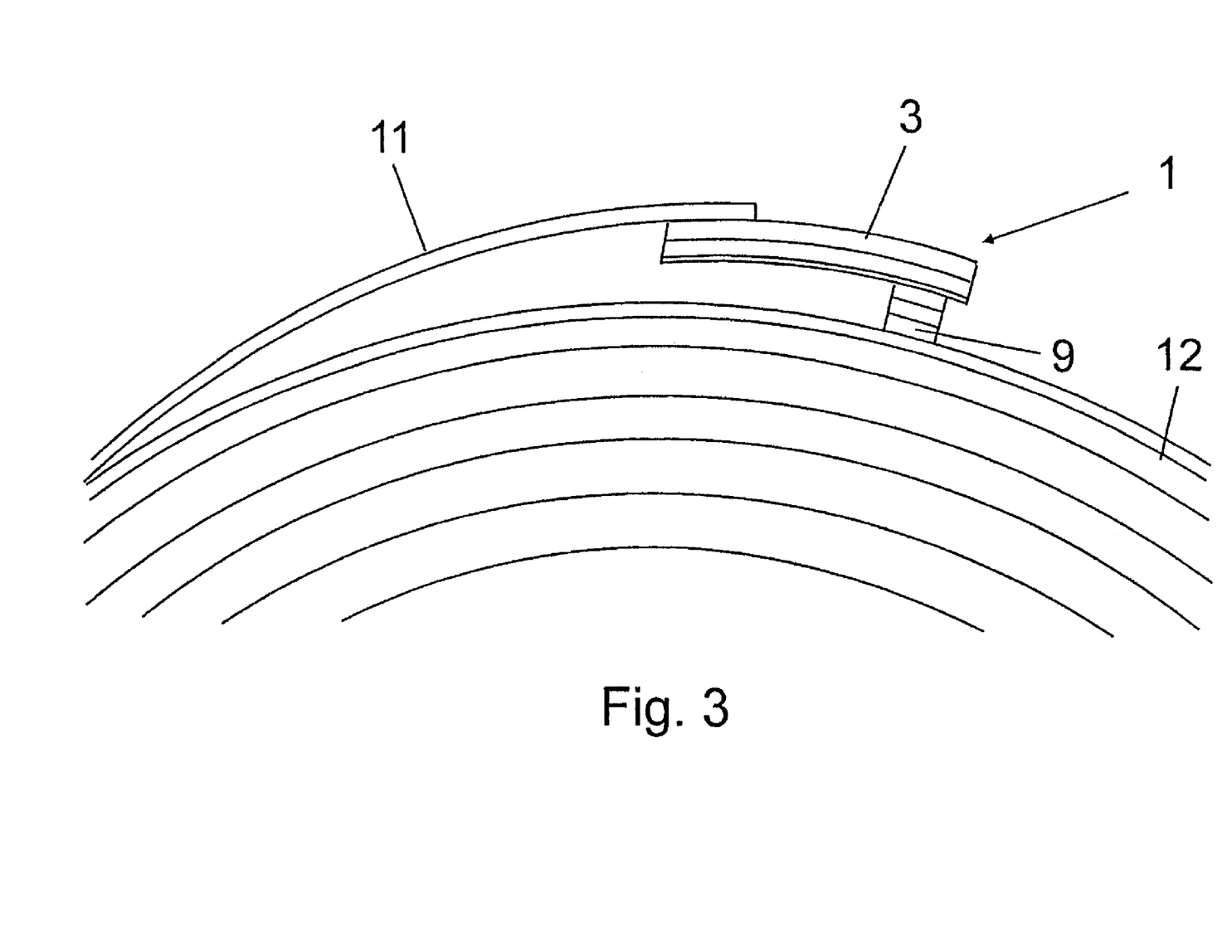
FIG. 3 shows a lateral schematic view of an adhesive tape according to FIG. 1, bonded to a paper reel and ready for the flying reel change

FIG. 3 illustrates how such an adhesive tape 1 is stuck under a paper web 11 of a new paper reel, specifically with the left-hand part, after the part 4a of the release paper 4 has been pulled off the latter. The adhesive tape has previously been stuck with the exposed self-adhesive compound 9 onto the paper web 12 belonging to the paper reel and lying under the paper web 11. The right-hand part 4b of the release paper 4 has also been pulled off, so that the paper reel equipped in this way is ready for a flying reel change, the bonding of the adhesive tape 1 running at right angles over the reel.

The self-adhesive compound 3 is then exposed and, for the flying change, constitutes the contact area with webs that are running out. The contact area has a width of 120 mm and extends over the entire width of the paper reel.

Figure 4:
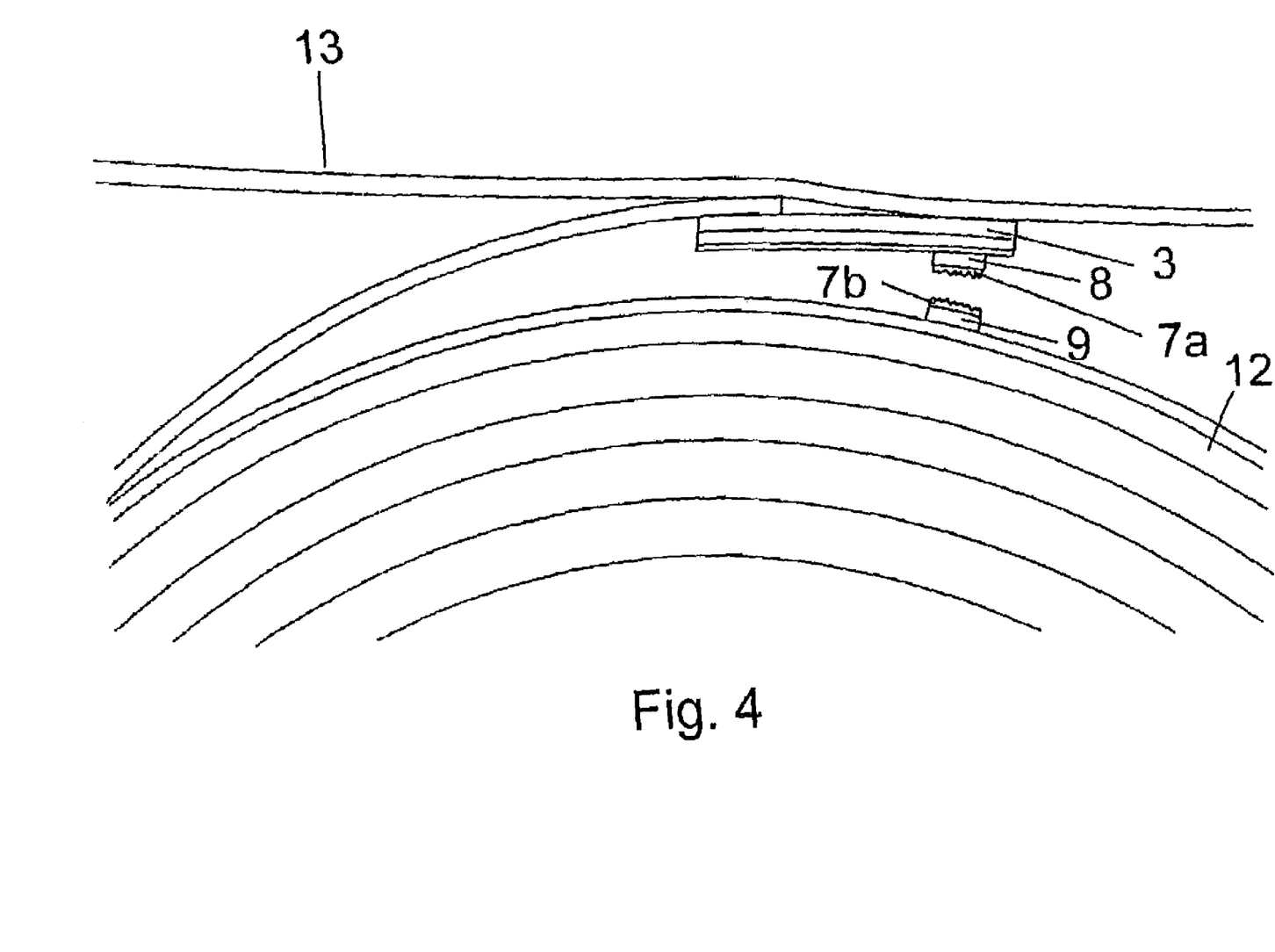
FIG. 4 shows a view according to FIG. 2 but after the flying reel change has been carried out.

The (new) paper reel equipped in this way is brought alongside the unwound (old) paper reel, to which the new is to be attached. The new paper reel is accelerated to a rotational speed which corresponds virtually to the speed of the web running out. Once both speeds have been synchronized adequately, the change can be completed. In the process, the splice is detected by means of a detector, which is located on the reel changer, and the position is located exactly. The web 13 that is running out is brought into contact with the circumference of the new reel by means of a pressure shaft (not illustrated) and the self-adhesive compound 3 is stuck to the paper web 13 that is running out in accordance with FIG. 4. By means of the detector and the signal function of the adhesive tape, the exact time at which the paper web that is running out is pressed against the new paper reel is determined, and cutting off of the old paper web is controlled. Instantaneously after the adhesive contact, the cleavable paper carriers 7 cleave in such a way that one part 7a remains on the adhesive tape 1 and covers the self-adhesive compound 8 there, while the other part 7b remains on the self-adhesive compound 9 which sticks to the paper web 12. Therefore, both self-adhesive compounds 8 and 9 are neutralized to a certain extent, no longer stick and therefore cannot interfere in the further process in the paper processing machines either.

In the further course of the processing process, the region of the paper with the splice is sorted out, in order that this does not interfere in the further function of the paper (in this way, for example, in printing presses newspapers with bonded splices are prevented from being put on sale). The sorting out takes place at what is known as the reject diverter. Here, too, the splice is detected without contact via the integrated switching function, and the appropriate piece of paper is sorted out by machine.

The use of an inventive adhesive tape with integrated switching function ensures stable detection without the application of further labels. It is therefore always ensured that identification of the splice is possible.

The invention claimed is:

1. An adhesive tape for flying reel change of flat web material wound up on reels, said adhesive tape comprising
    a main carrier comprising a carrier material and a metal dust or metal granulates having detectable metallic properties, wherein the metal dust or metal granulates are dispersed throughout the carrier material,
    a self-adhesive compound disposed on a front side of the main carrier, and
    at least one strip of a double-sided adhesive tape disposed on a rear side of the main carrier, said double-sided adhesive tape comprising a cleavable carrier and a self-adhesive compound on both sides of said cleavable carrier.

2. The adhesive tape according to claim 1, where in the metal dust or metal granulate is aluminum.

3. A method for splicing during a flying reel change of flat web material wound up on reels, said method comprising the steps of:
    a) providing the adhesive tape according to claim 1;
    b) adhering an uppermost paper web of a new reel to the web lying underneath with said adhesive tape;
    c) exposing part of said self-adhesive compound which is needed for the splicing process;
    d) placing the new reel beside an old reel which is unwinding and is to be replaced;
    e) accelerating the new reel to substantially the same speed as the old reel;
    f) pressing the new reel against the old reel, wherein the exposed self-adhesive compound of the adhesive tape bonds adhesively to the uppermost paper web of the old reel, while at the same time cleaving said cleavable adhesive system, wherein following the cleaving, no adhesive regions are exposed; and
    g) determining the time of the splicing operation by detecting at least one device being disposed on the adhesive tape for monitoring and having detectable metallic properties in form of metal dust or metal granulates for monitoring the flat web material for flying reel change.

4. A method according to claim 3, wherein the detecting is achieved by means of metal detectors, electromagnetic waves, transponders, thin layer transponders, optical effects, bar codes, optical reflection, diffraction gratings or color detection.

* * * * *

UNITED STATES PATENT AND TRADEMARK OFFICE
CERTIFICATE OF CORRECTION

| | | |
|---|---|---|
| PATENT NO. | : 7,264,194 B2 | Page 1 of 1 |
| APPLICATION NO. | : 10/488151 | |
| DATED | : September 4, 2007 | |
| INVENTOR(S) | : Gassner et al. | |

It is certified that error appears in the above-identified patent and that said Letters Patent is hereby corrected as shown below:

In the Specification

Column 1, line 61, "DE 198 30 679" should read -- DE 198 30 674 --

Signed and Sealed this
Eleventh Day of February, 2014

Michelle K. Lee
*Deputy Director of the United States Patent and Trademark Office*